(12) United States Patent
Choi et al.

(10) Patent No.: US 12,355,073 B2
(45) Date of Patent: Jul. 8, 2025

(54) NEGATIVE ELECTRODE ACTIVE MATERIAL, NEGATIVE ELECTRODE INCLUDING THE SAME, AND SECONDARY BATTERY INCLUDING THE NEGATIVE ELECTRODE

(71) Applicant: LG ENERGY SOLUTION, LTD., Seoul (KR)

(72) Inventors: Jung Hyun Choi, Daejeon (KR); Yong Ju Lee, Daejeon (KR); Eun Kyung Kim, Daejeon (KR); Rae Hwan Jo, Daejeon (KR); Su Min Lee, Daejeon (KR); Dong Hyuk Kim, Daejeon (KR); Se Mi Park, Daejeon (KR); Il Geun Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 220 days.

(21) Appl. No.: 16/762,080

(22) PCT Filed: Nov. 9, 2018

(86) PCT No.: PCT/KR2018/013636
§ 371 (c)(1),
(2) Date: May 6, 2020

(87) PCT Pub. No.: WO2019/093820
PCT Pub. Date: May 16, 2019

(65) Prior Publication Data
US 2020/0343544 A1    Oct. 29, 2020

(30) Foreign Application Priority Data

Nov. 9, 2017    (KR) .................... 10-2017-0148837

(51) Int. Cl.
*H01M 4/38* (2006.01)
*H01M 4/02* (2006.01)
(Continued)

(52) U.S. Cl.
CPC ........... *H01M 4/386* (2013.01); *H01M 4/131* (2013.01); *H01M 4/366* (2013.01); *H01M 4/583* (2013.01);
(Continued)

(58) Field of Classification Search
CPC ...... H01M 4/386; H01M 4/131; H01M 4/362; H01M 4/583; H01M 10/0525; H01M 2004/021; H01M 2004/027
See application file for complete search history.

(56) References Cited

U.S. PATENT DOCUMENTS

2005/0074672 A1    4/2005   Matsubara et al.
2010/0136432 A1    6/2010   Kim
(Continued)

FOREIGN PATENT DOCUMENTS

JP    2004-335195 A    11/2004
JP    2005-108774 A    4/2005
(Continued)

OTHER PUBLICATIONS

Machine Translation of Mai (Year: 2014).*
(Continued)

*Primary Examiner* — Matthew T Martin
*Assistant Examiner* — Ankith R Sripathi
(74) *Attorney, Agent, or Firm* — BRYAN CAVE LEIGHTON PAISNER LLP (57) ABSTRACT

The present invention relates to a negative electrode active material including a spherical carbon-based particle, and a carbon layer disposed on the spherical carbon-based particle and including a nano-particle, wherein the nano-particle has (Continued)

a silicon core, an oxide layer disposed on the silicon core and including SiO$_x$ (0<x≤2), and a coating layer covering at least a portion of the surface of the oxide layer and including LiF.

16 Claims, 3 Drawing Sheets

(51) Int. Cl.
  *H01M 4/131* (2010.01)
  *H01M 4/36* (2006.01)
  *H01M 4/583* (2010.01)
  *H01M 10/0525* (2010.01)

(52) U.S. Cl.
  CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2011/0097629 | A1 | 4/2011 | Yew et al. |
| 2013/0122369 | A1* | 5/2013 | Kim ............... H01M 4/0402 977/773 |
| 2016/0013481 | A1 | 1/2016 | Jeong et al. |
| 2016/0164079 | A1* | 6/2016 | Bae ................ H01M 4/0411 264/105 |
| 2016/0336592 | A1 | 11/2016 | Hirose et al. |
| 2016/0365572 | A1 | 12/2016 | Mun et al. |
| 2017/0040599 | A1 | 2/2017 | Kamo et al. |
| 2017/0069909 | A1 | 3/2017 | Eom et al. |
| 2017/0117543 | A1 | 4/2017 | Park et al. |
| 2018/0097229 | A1* | 4/2018 | Jo ..................... H01M 4/62 |
| 2019/0177171 | A1* | 6/2019 | Troegel ........... H01M 4/0471 |
| 2019/0190020 | A1* | 6/2019 | Park ................. H01M 4/38 |
| 2019/0334167 | A1 | 10/2019 | Kamo et al. |

FOREIGN PATENT DOCUMENTS

| | | |
|---|---|---|
| JP | 2012-156055 A | 8/2012 |
| JP | 2014-071948 A | 4/2014 |
| JP | 2014086237 A | 5/2014 |
| JP | 2015-156328 A | 8/2015 |
| JP | 2015-165482 A | 9/2015 |
| JP | 2016-066508 A | 4/2016 |
| JP | 2010-501970 A | 1/2020 |
| JP | 2021501976 A | 1/2021 |
| KR | 10-2010-0062083 A | 6/2010 |
| KR | 2011-0046076 A | 5/2011 |
| KR | 10-2013-0052397 A | 5/2013 |
| KR | 10-2014-0089643 A | 7/2014 |
| KR | 10-2014-0101640 A | 8/2014 |
| KR | 10-2015-0112746 A | 10/2015 |
| KR | 10-2016-0008041 A | 1/2016 |
| KR | 10-2016-0118260 A | 10/2016 |
| KR | 10-2016-0144832 A | 12/2016 |
| KR | 10-2017-0028099 A | 3/2017 |
| KR | 10-2017-0042115 A | 4/2017 |
| KR | 20170048211 A | 5/2017 |

OTHER PUBLICATIONS

International Search Report (with partial translation) and Written Opinion issued in corresponding International Patent Application No. PCT/KR2018/013636, dated Feb. 19, 2019.

Extended European Search Report issued in related European Application No. 18875222.4 dated Nov. 5, 2020.

Yang et al., "Effects of lithium fluoride coating on the performance of nano-silicon as anode material for lithium-ion batteries," Materials Letters, vol. 184, 2016, pp. 65-68.

"A Basic Guide to Particle Characterization," Malvern Instruments Worldwide, White Paper, May 2, 2012, pp. 1-26.

Hu et al., "Superior Storage Performance of a Si@SiOx/C Nanocomposite as Anode Material for Lithium-Ion Batteries," Angew. Chem. Int. Ed. 47, 2008, pp. 1645-1649.

* cited by examiner

NEGATIVE ELECTRODE ACTIVE MATERIAL, NEGATIVE ELECTRODE INCLUDING THE SAME, AND SECONDARY BATTERY INCLUDING THE NEGATIVE ELECTRODE

CROSS-REFERENCE TO RELATED APPLICATIONS

This application claims the benefit of Korean Patent Application No. 10-2017-0148837, filed on Nov. 9, 2017, in the Korean Intellectual Property Office, the disclosure of which is incorporated herein in its entirety by reference.

TECHNICAL FIELD

The present invention relates to a negative electrode active material, a negative electrode including the same, and a secondary battery including the negative electrode. Specifically, the negative electrode active material includes a spherical carbon-based particle; and a carbon layer disposed on the spherical carbon-based particle and including a nano-particle, wherein the nano-particle has a silicon core; an oxide layer disposed on the silicon core and including $SiO_x$ (0<x≤2), and a coating layer covering at least a portion of the surface of the oxide layer and including LiF.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased.

In general, a secondary battery is composed of a positive electrode, a negative electrode, an electrolyte, and a separator. The negative electrode includes a negative electrode active material for intercalating and de-intercalating lithium ions from the positive electrode, and as the negative electrode active material, a silicon-based particle having high discharge capacity may be used. However, a silicon-based particle such as $SiO_x$ (0≤x<2) has low initial efficiency, and the volume thereof excessively changes during charging and discharging, causing a side reaction with an electrolyte. Therefore, there arises a problem in that the lifespan and safety of a battery are deteriorated.

Typically, in order to solve such a problem, there have been attempts to combine a carbon-based material which has high initial efficiency and a silicon-based particle (Korean Patent Laid-Open Publication No. 10-2015-0112746).

However, despite the above-mentioned attempts, the problem of the occurrence of a side reaction between a silicon-based particle and an electrolyte still exits, and the control of volume expansion is not easy. As a result, the lifespan and stability of a battery have not been effectively improved.

Therefore, there is a demand for a negative electrode active material capable of effectively controlling the volume expansion during charging and discharging and the side reaction with an electrolyte while allowing a battery to have high capacity and high initial efficiency.

PRIOR ART DOCUMENT

Patent Document (Patent Document 1) Korean Patent Laid-Open Publication No. 10-2015-0112746

DISCLOSURE OF THE INVENTION

Technical Problem

An aspect of the present invention provides a negative electrode active material which is capable of effectively controlling the volume expansion during charging and discharging and the side reaction with an electrolyte while allowing a battery to have high capacity and high initial efficiency, a negative electrode including the same, and a secondary battery including the negative electrode.

Technical Solution

According to an aspect of the present invention, there is provided a negative electrode active material including a spherical carbon-based particle and a carbon layer disposed on the spherical carbon-based particle and including a nano-particle, wherein the nano-particle has a silicon core, an oxide layer disposed on the silicon core and including $SiO_x$ (0<x≤2), and a coating layer covering at least a portion of the surface of the oxide layer and including LiF.

According to another aspect of the present invention, there are provided a negative electrode including the negative electrode active material, and a secondary battery including the negative electrode.

Advantageous Effects

According to a negative electrode active material according to an embodiment of the present invention, the initial efficiency and discharge capacity of a battery may be improved by a coating layer including LiF, and a side reaction between a negative electrode active material and an electrolyte and the volume expansion of the negative electrode active material may be effectively controlled. In addition, the discharge capacity of the battery may be further improved by using a spherical carbon-based particle.

MODE FOR CARRYING OUT THE INVENTION

Hereinafter, the present invention will be described in more detail to facilitate understanding of the present invention.

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Figure 1:
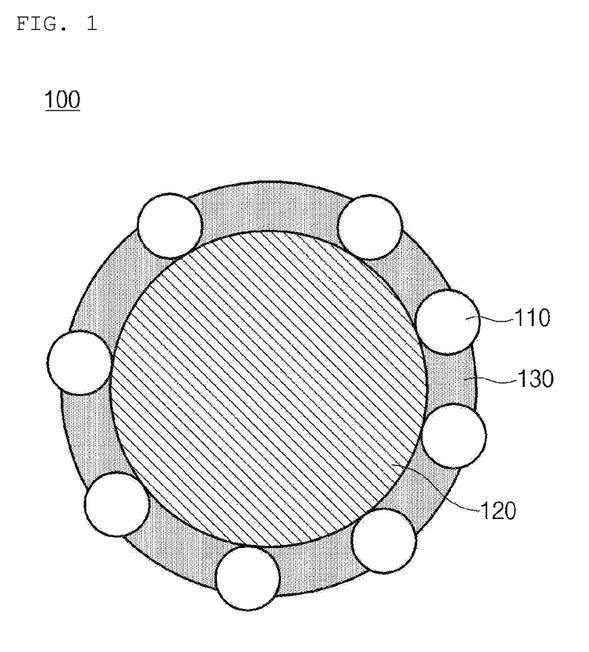
FIG. 1 is a schematic view of a negative electrode active material of the present invention.
Figure 2:
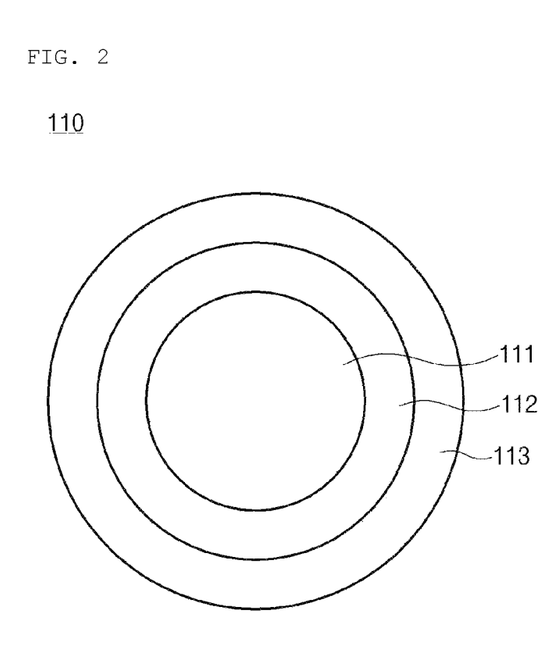
FIG. 2 is a schematic view of a first particle included in a negative electrode active material according to the present invention.

Referring to FIG. 1 and FIG. 2, a negative electrode active material (100) according to an embodiment of the present invention includes a spherical carbon-based particle (120), and a carbon layer (130) disposed on the spherical carbon-based particle (120) and including nano-particles (110), wherein the nano-particles (110) each have a silicon core (111), an oxide layer (112) disposed on the silicon core (111) and including $SiO_x$ (0<x≤2), and a coating layer (113) covering at least a portion of the surface of the oxide layer (112) and including LiF.

The spherical carbon-based particle (120) may improve the discharge capacity of a battery. In addition, since the spherical carbon-based particle (120) is spherical, the capacity and efficiency of the battery may be stably secured even if the silicon content is small. Here, a spherical shape refers not only to a perfect spherical shape having a set of points where the distance from the center point to the surface thereof is constant, but also to a somewhat round shape, specifically a shape satisfying a specific sphericity.

The spherical carbon-based particle (120) may be at least any one selected from the group consisting of natural graphite, artificial graphite, hard carbon, and soft carbon.

Sphericity of the spherical carbon-based particle (120) may be 0.5 to 1, specifically 0.55 to 0.95, and more specifically 0.6 to 0.9. When the above range is satisfied, the agglomeration of the nano-particles (110) is suppressed, and the capacity, lifespan, and efficiency of the battery may be stably secured. Furthermore, the electrode thickness change rate may be reduced. The sphericity may be measured through a particle shape analyzer (QICPIC-LIXELL, Sympatec GmbH). Specifically, a cumulative distribution of the sphericity of the spherical carbon-based particles (120) is derived through the particle shape analyzer, and then a sphericity corresponding to 50% of the distribution ratio from particles having large sphericity may be determined as the sphericity of the spherical carbon-based particles (120).

Preferably, when the spherical carbon-based particle (120) is natural graphite, the sphericity may be 0.7 to 1, specifically 0.75 to 0.9. When the spherical carbon-based particle (120) is natural graphite and the above range is satisfied, the agglomeration of the nano-particles (110) is suppressed, and the capacity, lifespan, and efficiency of the battery may be stably secured. Furthermore, the electrode thickness change rate may be reduced.

The average particle diameter ($D_{50}$) of the spherical carbon-based particle (120) may be 2 μm to 50 μm, specifically 3 μm to 30 μm, and more specifically 5 μm to 20 μm. When the above range is satisfied, the preparation of a negative electrode active material is facilitated, and the charging and discharging of a battery may be effectively achieved. In the present specification, the average particle diameter ($D_{50}$) may be defined as a particle diameter corresponding to 50% of the volume accumulation in a particle diameter distribution curve. The average particle diameter ($D_{50}$) may be measured by using, for example, a laser diffraction method. The laser diffraction method generally enables measurement of a particle diameter of several millimeters from a sub-micron region, so that results of high reproducibility and high resolution may be obtained.

The spherical carbon-based particle (120) may be included in an amount of 40 wt % to 95 wt % based on the total weight of the negative electrode active material (100), specifically 50 wt % to 93 wt %, and more specifically 60 wt % to 90 wt %. When the above range is satisfied, the carbon particles (120) is prevented from being agglomerated into a second particle form, so that the preparation of a desired negative electrode active material may be facilitated.

The carbon layer (130) may be disposed on the spherical carbon-based particle (120). Specifically, the carbon layer (130) may be present in the form of covering at least a portion of the spherical carbon-based particle (120), and more specifically the carbon layer (130) may be present in the form of covering all of the spherical carbon-based particle (120).

The carbon layer (130) may include at least any one of amorphous carbon and crystalline carbon.

The crystalline carbon may further improve the conductivity of the negative electrode active material (100). The crystalline carbon may include at least any one selected from the group consisting of fullerene, carbon nanotube, and graphene.

The amorphous carbon may appropriately maintain the strength of the carbon layer (130), thereby suppressing the expansion of the nano-particles (110). The amorphous carbon may be at least any one carbide selected from the group consisting of tar, pitch, and other organic materials, or a carbon-based material formed by using hydrocarbon as a source of chemical vapor deposition.

The carbide of the other organic materials may be a carbide of an organic material selected from the group consisting of sucrose, glucose, galactose, fructose, lactose, mannose, ribose, aldohexose or ketohexose carbides and combinations thereof.

The hydrocarbon may be substituted or unsubstituted aliphatic or alicyclic hydrocarbon, or substituted or unsubstituted aromatic hydrocarbon. Aliphatic or alicyclic hydrocarbon of the substituted or unsubstituted aliphatic or alicyclic hydrocarbon may be methine, ethene, ethylene, acetylene, propene, butane, butene, pentene, isobutene or hexane, and the like. Aromatic hydrocarbon of the substituted or unsubstituted aromatic hydrocarbon may be benzene, toluene, xylene, styrene, ethylbenzene, diphenylmethane, naphthalene, phenol, cresol, nitrobenzene, chlorobenzene, indene, coumarone, pyridine, anthracene, or phenanthrene, and the like.

The carbon layer (130) may be included in an amount of 0.5 wt % to 50 wt % based on the total weight of the negative electrode active material (100), specifically 2 wt % to 35 wt %, and more specifically 5 wt % to 25 wt %. When the above range is satisfied, a conductive path may be effectively secured. At the same time, since the carbon layer (130) is capable of strengthening the binding between the nano-particles (110) and the spherical carbon-based particle (120), the nano-particles (110) may be effectively prevented from being separated from the carbon-based particle (120) during charging and discharging the battery.

The thickness of the carbon layer (130) may be 10 nm to 15 μm, specifically 15 nm to 10 μm, and more specifically 20 nm to 8 μm. When the above range is satisfied, the complexation of nano-particles and a carbon-based particle may be effectively achieved.

The carbon layer (130) may include nano-particles. At least a portion of the nano-particles may come into contact with the spherical carbon-based particle (120). The nano-particles may not be exposed to the outside by the carbon layer (130). Alternatively, at least a portion of the nano-particles may be exposed to the outside.

The nano-particles each may include a silicon core, an oxide layer, and a coating layer.

The silicon core may include Si, and may be specifically made of Si. Accordingly, the capacity of a secondary battery may be increased.

The average particle diameter ($D_{50}$) of the silicon core may be 40 nm to 400 nm, specifically 60 nm to 200 nm, and more specifically 80 nm to 150 nm. When the above range is satisfied, the silicon core of a nano size is not easily broken during charging and discharging of the battery, and the intercalation and de-intercalation of lithium may be effectively performed.

The oxide layer may be disposed on the silicon core. Specifically, the oxide layer may cover at least a portion of the silicon core.

The oxide layer may include $SiO_x$ ($0<x\leq2$), and may specifically include $SiO_2$. Accordingly, during charging and discharging of the secondary battery, the excessive volume change of the silicon core may be controlled.

The thickness of the oxide layer may be 0.01 nm to 20 nm, specifically 0.05 nm to 15 nm, and more specifically 0.1 nm to 10 nm. When the above range is satisfied, the capacity of the secondary battery is maintained, and the excessive volume change of the silicon core may be effectively controlled.

The coating layer may cover at least a portion of the surface of the oxide layer. Specifically, the coating layer may be disposed so as to cover all of the surface of the oxide layer, or disposed so as to cover a portion of the surface.

The coating layer may include LiF, and may be specifically made of LiF. The LiF of the coating layer may serve as a kind of SEI film so that a side reaction between the silicon core and the electrolyte may be prevented, and the lithium ion conductivity may be improved. Furthermore, the excessive volume expansion of the silicon core may be controlled. Accordingly, the initial efficiency of a negative electrode may be improved. Specifically, although not limited thereto, the LiF included in the coating layer may be made of a crystalline phase and an amorphous phase by a heat treatment applied during the production of a negative electrode active material. At this time, the lithium ion conductivity may be improved by the interface between the crystalline phase and the amorphous phase.

The LiF may be included in an amount of 0.01 wt % to 25 wt % based on the total weight of the negative electrode active material (100), specifically 0.05 wt % to 12 wt %, and more specifically 0.2 wt % to 5 wt %. When the above range is satisfied, a side reaction between the silicon core and the electrolyte may be effectively prevented, and the lithium ion conductivity may be effectively improved. Furthermore, the excessive volume expansion of the silicon core may be effectively controlled. As a result, the initial efficiency of the negative electrode may be effectively improved.

The thickness of the coating layer may be 0.01 nm to 50 nm, specifically 0.05 nm to 15 nm, and more specifically 0.1 nm to 10 nm. When the above range is satisfied, the effect of the coating layer described above may be further improved.

The oxide layer may further include lithium silicate. The lithium silicate may be formed when an appropriate ratio of an oxide layer and a coating layer are heat-treated at a specific heat treatment temperature in the formation of the carbon layer. That is, the lithium silicate may be a by-product formed by the reaction of the LiF and the oxide layer. Since the initial irreversible capacity of a battery may be reduced by the lithium silicate, the initial efficiency of the battery may be improved. The lithium silicate may include at least any one of $Li_2SiO_3$, $Li_4SiO_4$, and $Li_2Si_2O_5$, and may specifically include $Li_2SiO_3$.

The nano-particles may be included in an amount of 1 wt % to 50 wt % based on the total weight of the negative electrode active material (100), specifically 2 wt % to 40 wt %, and more specifically 3 wt % to 35 wt %. When the above range is satisfied, the complexation with the spherical carbon-based particle (120) may be smoothly achieved, and a side reaction between a negative electrode active material and an electrolyte may be reduced.

The weight ratio of the spherical carbon-based particle (120) to the nano-particles may be 98:2 to 50:50, specifically 97.5:2.5 to 55:45, and more specifically 95:5 to 60:40. When the above range is satisfied, the capacity and efficiency of the battery may be stably secured.

A method for preparing a negative electrode active material according to another embodiment of the present invention may include preparing a silicon core having an oxide layer including $SiO_x$ ($0<x\leq2$) disposed on the surface thereof; forming a coating layer including LiF on the oxide layer to form a plurality of nano-particles; and disposing a carbon layer including the nano-particles on a spherical carbon-based particle.

In the preparing of a silicon core having an oxide layer including $SiO_x$ ($0<x\leq2$) disposed on the surface thereof, the oxide layer may be formed by heat treating the silicon core in oxygen or air, or may be formed on the silicon core through a milling process. However, the present invention is not necessarily limited thereto.

In the forming of a coating layer including LiF on the oxide layer to form a plurality of nano-particles, the coating layer may be formed by the following method.

The coating layer may be formed by a method in which the silicon core formed on the oxide layer is milled with the LiF and then pulverized and mixed. Alternatively, the coating layer may be formed by dispersing the silicone core in a solvent, and then mixing with lithium acetate and ammonium fluoride there together. Alternatively, the coating layer may be formed by disposing the LiF on the oxide layer through sputtering. However, the present invention is not necessarily limited thereto.

The disposing of a carbon layer including the nano-particles on a spherical carbon-based particle may include the following method.

The nano-particles are dispersed in a solvent to prepare a mixed solution. The spherical carbon-based particle and an organic solution that can be a pitch or carbon source are dispersed in the mixed solution to prepare a slurry. The slurry may be heat treated and pulverized to form the carbon layer, and at the same time, the nano-particles may be included in the carbon layer. Alternatively, the slurry may be subjected to spay drying and pulverized to form the carbon layer. Alternatively, the nano-particles may be mixed with only the spherical carbon-based particle and heat-treated to dispose the nano-particles on the spherical carbon-based particle. Thereafter, the carbon layer may be formed by chemical vapor deposition (CVD) or by mixing an organic material such as a pitch and carbonizing. However, the present invention is not necessarily limited thereto.

A negative electrode according to another embodiment of the present invention may include a negative electrode active material, and in this case, the negative electrode active material may be the same as the negative active materials of the embodiments described above. Specifically, the negative electrode may include a current collector and a negative electrode active material layer disposed on the current collector. The negative electrode active material layer may include the negative electrode active material. Furthermore, the negative electrode active material layer may include a binder and/or a conductive material.

The current collector is not particularly limited as long as it has conductivity without causing a chemical change in the battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which adsorbs carbon such as copper and nickel well may be used as the current collector. The thickness of the current collector may be from 6 μm to 20 μm, but the thickness of the current collector is not limited thereto.

The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber, poly acrylic acid, materials having the hydrogen thereof substituted with Li, Na, or Ca, and the like, and a combination thereof. In addition, the binder may include various copolymers thereof.

The conductive material is not particularly limited as long as it has conductivity without causing a chemical change in the battery. For example, graphite such as natural graphite or artificial graphite; a carbon-based material such as carbon black, acetylene black, Ketjen black, channel black, furnace black, lamp black, and thermal black; conductive fiber such as carbon fiber and metal fiber; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used.

A secondary battery according to another embodiment of the present invention may include a negative electrode, a positive electrode, a separator interposed between the positive electrode and the negative electrode, and an electrolyte. The negative electrode is the same as the negative electrode described above. Since the negative electrode has been described above, the detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be prepared on the surface of the positive electrode current collector to improve the adhesion of the positive electrode active material. The positive electrode current collector may be used in various forms of such as a film, a sheet, a foil, a net, a porous body, a foam, and a non-woven body.

The positive electrode active material may be a positive electrode active material commonly used in the art. Specifically, the positive electrode active material may be a layered compound such as lithium cobalt oxide ($LiCoO_2$) and lithium nickel oxide ($LiNiO_2$), or a compound substituted with one or more transition metals; a lithium iron oxide such as $LiFe_3O_4$; a lithium manganese oxide such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_{c2}O_2$ (wherein M is any one of Co, Mn, Al, Cu, Fe, Mg, B or Ga, and $0.01 \leq c2 \leq 0.3$); a lithium manganese composite oxide represented by the formula $LiMn_{2-c3}M_{c3}O_2$ (wherein, M is any one of Co, Ni, Fe, Cr, Zn, or Ta, and $00.01 \leq c3 \leq 0.1$), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used.

In addition, the binder serves to improve the bonding between positive electrode active material particles and the adhesion between the positive electrode active material and the positive electrode current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, cyclic carbonates ethylene carbonate and propylene carbonate may be preferably used since they are organic solvents of a high viscosity having high permittivity to dissociate a lithium salt well. Furthermore, such a cyclic carbonate may be more preferably used since the cyclic carbonate may be mixed with a linear carbonate of a low viscosity and low permittivity such as dimethyl carbonate and diethyl carbonate in an appropriate ratio to prepare an electrolyte having a high electric conductivity.

As the metal salt, a lithium salt may be used. The lithium salt is a material which is easily dissolved in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan characteristics of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to another embodiment of the present invention, a battery module including the secondary battery as a unit cell, and a battery pack including the same are provided. The battery module and the battery pack include the secondary battery which has high capacity, high rate characteristics, and cycle characteristics, and thus, may be used as a power source of a medium-and-large sized device selected from the group consisting of an electric car, a hybrid electric vehicle, a plug-in hybrid electric vehicle, and a power storage system.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Preparation of Battery (1) Preparation of Negative Electrode Active Material 4.1 g of silicon (Si) having a maximum particle diameter ($D_{max}$) of 45 μm and 0.08 g of LiF were added to 30 g of isopropanol to prepare a mixed solution. Thereafter, the mixture was pulverized for 30 hours at a bead rotation speed of 1,200 rpm using beads made of zirconia (average particle diameter: 0.3 mm). At this time, the average particle diameter ($D_{50}$) of the generated silicon was 100 nm, the thickness of $SiO_2$ formed on the surface of the silicon surface was 10 nm, and the thickness of LiF disposed on the $SiO_2$ was 0.1 nm to 10 nm.

Subsequently, 20 g of spherical natural graphite having an average particle diameter ($D_{50}$) of 15 μm and a sphericity of 0.8 and 3.3 g of a solid phase pitch were added to the mixed solution and dispersed to prepare a slurry.

The slurry and ethanol/water (volume ratio=1:9) were mixed at a volume ratio of 1:10 to prepare a dispersion for spray drying. The dispersion was spray dried through a mini spray-dryer (manufacturer: Buchi, Model: B-290 Mini Spray-Dryer) under the conditions of an inlet temperature of 180° C., an aspirator of 95% and a feeding rate of 12. Thereafter, 20 g of the spray-dried mixture (composite) was heat treated at 950° C. under a nitrogen atmosphere to prepare a negative electrode active material. LiF (corresponding to the coating layer of the present invention) in the prepared negative electrode active material was 0.3 wt % based on the total weight of the negative electrode active material. The Li content was measured by ICP and the F content was measured by ion chromatography, and then the sum was calculated. In addition, the sphericity of spherical natural graphite in the prepared negative electrode active material was confirmed to be 0.7.

(2) Preparation of Negative Electrode

The prepared negative electrode active material, carbon black as a conductive material, carboxymethylcellulose (CMC) as a binder, and styrene butadiene rubber (SBR) were mixed at a weight ratio of 95.8:1:1.7:1.5 to prepare a mixture. Thereafter, 0.8 g of distilled water was added to 5 g of the mixture and stirred to prepare a negative electrode slurry. The negative electrode slurry was applied on a copper (Cu) metal thin film having a thickness of 20 µm, which is a negative electrode current collector, and then dried. At this time, the temperature of circulated air was 60° C. Thereafter, the copper (Cu) metal thin film applied with the negative electrode slurry and then dried was roll pressed and dried in a vacuum oven at 130° C. for 12 hours to prepare a negative electrode.

(3) Preparation of Secondary Battery

A lithium (Li) metal thin film, which was prepared by cutting the prepared negative electrode into a circular shape of 1.7671 cm$^2$, was prepared as a positive electrode. A porous polyethylene separator was interposed between the positive electrode and the negative electrode, and then vinylene carbonate dissolved in 0.5 wt % was dissolved in a mixed solution in which methyl ethyl carbonate (EMC) and ethylene carbonate (EC) are mixed in a mixing volume ratio of 7:3. Thereafter, an electrolyte in which LiPF6 of 1.0 M concentration is dissolved was injected to manufacture a lithium coin half-cell.

Example 2: Preparation of Battery

(1) Preparation of Negative Electrode Active Material 4.1 g of silicon (Si) having a maximum particle diameter ($D_{max}$) of 45 µm and 2.05 g of LiF were added to 30 g of isopropanol to prepare a mixed solution. Thereafter, the mixture was pulverized for 30 hours at a bead rotation speed of 1,200 rpm using beads made of zirconia (average particle diameter: 0.3 mm). At this time, the average particle diameter ($D_{50}$) of the generated silicon was 100 nm, the thickness of SiO$_2$ formed on the surface of the silicon surface was 10 nm, and the thickness of LiF disposed on the SiO$_2$ was 0.1 nm to 30 nm.

Subsequently, 20 g of spherical natural graphite having an average particle diameter ($D_{50}$) of 15 µm and a sphericity of 0.8 and 3.3 g of a solid phase pitch were added to the mixed solution and dispersed to prepare a slurry.

The slurry and ethanol/water (volume ratio=1:9) were mixed at a volume ratio of 1:10 to prepare a dispersion for spray drying. The dispersion was spray dried through a mini spray-dryer (manufacturer: Buchi, Model: B-290 Mini Spray-Dryer) under the conditions of an inlet temperature of 180° C., an aspirator of 95% and a feeding rate of 12. Thereafter, 20 g of the spray-dried mixture (composite) was heat treated at 950° C. under a nitrogen atmosphere to prepare a negative electrode active material. LiF (corresponding to the coating layer of the present invention) in the prepared negative electrode active material was 7 wt % based on the total weight of the negative electrode active material. The Li content was measured by ICP and the F content was measured by ion chromatography, and then the sum was calculated. In addition, the sphericity of spherical natural graphite in the prepared negative electrode active material was confirmed to be 0.7.

(2) Preparation of Negative Electrode and Secondary Battery

A negative electrode and a secondary battery were prepared in the same manner as in Example 1 except that the negative electrode active material was used.

Example 3: Preparation of Battery

(1) Preparation of Negative Electrode Active Material 4.1 g of silicon (Si) having a maximum particle diameter ($D_{max}$) of 45 µm and 0.04 g of LiF were added to 30 g of isopropanol to prepare a mixed solution. Thereafter, the mixture was pulverized for 30 hours at a bead rotation speed of 1,200 rpm using beads made of zirconia (average particle diameter: 0.3 mm). At this time, the average particle diameter ($D_{50}$) of the generated silicon was 100 nm, the thickness of SiO$_2$ formed on the surface of the silicon surface was 10 nm, and the thickness of LiF disposed on the SiO$_2$ was 0.1 nm to 5 nm.

Subsequently, 20 g of spherical natural graphite having an average particle diameter ($D_{50}$) of 15 µm and a sphericity of 0.8 and 3.3 g of a solid phase pitch were added to the mixed solution and dispersed to prepare a slurry.

The slurry and ethanol/water (volume ratio=1:9) were mixed at a volume ratio of 1:10 to prepare a dispersion for spray drying. The dispersion was spray dried through a mini spray-dryer (manufacturer: Buchi, Model: B-290 Mini Spray-Dryer) under the conditions of an inlet temperature of 180° C., an aspirator of 95% and a feeding rate of 12. Thereafter, 20 g of the spray-dried mixture (composite) was heat treated at 950° C. under a nitrogen atmosphere to prepare a negative electrode active material. LiF (corresponding to the coating layer of the present invention) in the prepared negative electrode active material was 0.15 wt % based on the total weight of the negative electrode active material. In addition, the sphericity of spherical natural graphite in the prepared negative electrode active material was confirmed to be 0.7.

(2) Preparation of Negative Electrode and Secondary Battery

A negative electrode and a secondary battery were prepared in the same manner as in Example 1 except that the negative electrode active material was used.

Example 4: Preparation of Battery

A negative electrode active material was prepared in the same manner as in Example 1 except that natural graphite having a sphericity of 0.65 was sued in the preparation of the negative electrode active material of Example 1. LiF (corresponding to the coating layer of the present invention) in the prepared negative electrode active material was 0.3 wt % based on the total weight of the negative electrode active material. The Li content was measured by ICP and the F content was measured by ion chromatography, and then the sum was calculated. In addition, the sphericity of spherical natural graphite in the prepared negative electrode active material was confirmed to be 0.6.

Comparative Example 1 Preparation of Battery (1) Preparation of Negative Electrode Active Material A negative electrode active material was prepared in the same manner as in Example 1 except that LiF was not added when preparing a slurry in the preparation of the negative electrode active material of Example 1.

(2) Preparation of Negative Electrode and Secondary Battery

A negative electrode and a secondary battery were prepared in the same manner as in Example 1 using the negative electrode active material.

Experimental Example 1: Evaluation of Discharge Capacity, Initial Efficiency, Capacity Retention Rate and Electrode Thickness Change Rate The batteries of Examples 1 to 4 and Comparative Example 1 were subjected to charging and discharging to evaluate discharge capacity, initial efficiency, capacity retention rate, and electrode thickness change rate, and the results are shown in Table 1 below.

Meanwhile, for the first cycle and the second cycle, charging•discharging were performed at 0.1 C, and from the third cycle to the 49th cycle, charging. discharging were performed at 0.5 C. The 50th cycle was terminated in the state of charging (the state in which lithium was in the negative electrode), and then the battery was disassembled and the thickness thereof was measured to calculate the electrode thickness change rate.

Charging condition: CC(constant current)/CV(constant voltage)(5 mV/0.005 C current cut-off)

Discharging condition: CC(constant current)Condition 1.5V

The discharge capacity (mAh/g) and the initial efficiency (%) were derived from the result of one charge/discharge. Specifically, the initial efficiency (%) was derived by the following calculation.

Initial efficiency (%)=(discharge capacity after 1 discharge/charge capacity of 1 time)×100

The capacity retention rate and the electrode thickness change rate were derived by the following calculations, respectively.

Capacity retention rate (%)=(discharge capacity of 49 times/discharge capacity of 1 time)×100

Electrode thickness change rate (%)=(final negative electrode thickness variation/initial negative electrode thickness)×100

TABLE 1

| Battery | Discharge capacity (mAh/g) | Initial efficiency (%) | Capacity retention rate (%) | Electrode thickness chang rate (%) |
| --- | --- | --- | --- | --- |
| Example 1 | 640 | 87 | 60 | 130 |
| Example 2 | 635 | 86 | 59 | 135 |

TABLE 1-continued

| Battery | Discharge capacity (mAh/g) | Initial efficiency (%) | Capacity retention rate (%) | Electrode thickness chang rate (%) |
| --- | --- | --- | --- | --- |
| Example 3 | 635 | 85 | 58 | 150 |
| Example 4 | 634 | 86 | 57 | 155 |
| Comparative Example 1 | 630 | 84 | 54 | 170 |

Figure 3:
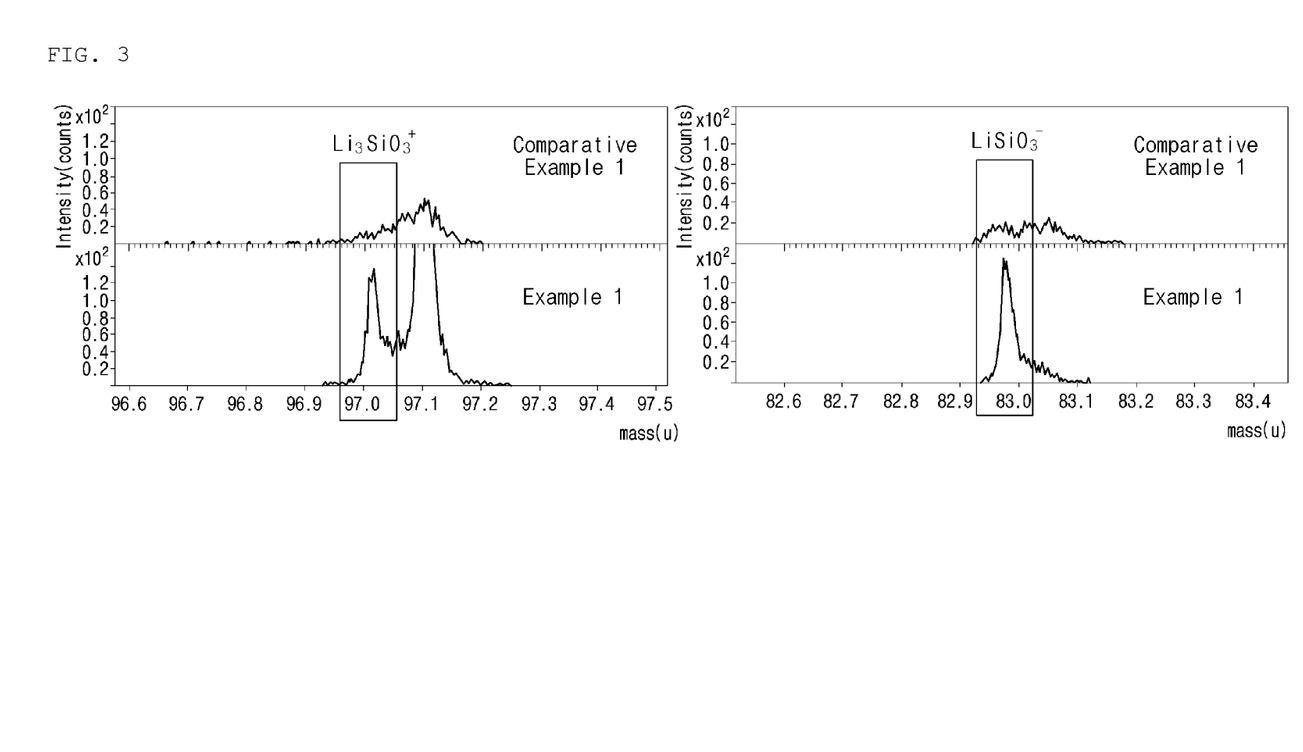
FIG. 3 is a graph of ToF-SIMS results of Example 1 and Comparative Example 1.

Referring to Table 1, in the case of Examples 1 to 4, the discharge capacity, the initial efficiency, the capacity retention rate, and the electrode thickness change rate are good. In the case of Comparative Example 1, since the negative electrode active material does not include LiF, a conductive path was not secured, thereby reducing the initial efficiency and discharge capacity. In addition, in the case of Example 1, since lithium silicate ($Li_2SiO_3$) formed from LiF and $SiO_2$ may be present in the negative electrode active material, the initial efficiency and discharge capacity may be further improved when compared with Comparative Example 1 in which lithium silicate is not present (See FIG. 3).

The invention claimed is:

1. A negative electrode active material comprising: a spherical carbon-based particle; and a carbon layer disposed on the spherical carbon-based particle and including a nano-particle, wherein
   the nano-particle comprises a three-layered structure including:
   a silicon core;
   an oxide layer directly disposed on the silicon core and including $SiO_x$ ($0<x\leq2$); and
   a coating layer directly disposed on at least a portion of a surface of the oxide layer and including LiF,
   wherein the spherical carbon-based particle is natural graphite,
   wherein sphericity of the spherical carbon-based particle is from 0.55 to 0.95,
   wherein the nano-particle is included in an amount of 1 wt % to 50 wt % based on a total weight of the negative electrode active material, and
   wherein the LiF is included in an amount of 0.05 wt % to 12 wt % based on the total weight of the negative electrode active material.

2. The negative electrode active material of claim 1, wherein an average particle diameter ($D_{50}$) of the silicon-core is from 40 nm to 400 nm.

3. The negative electrode active material of claim 1, wherein a thickness of the oxide layer is from 0.01 nm to 20 nm.

4. The negative electrode active material of claim 1, wherein the LiF is included in an amount of 0.01 wt % to 25 wt % based on a total weight of the negative electrode active material.

5. The negative electrode active material of claim 1, wherein a thickness of the coating layer is from 0.01 nm to 50 nm.

6. The negative electrode active material of claim 1, wherein an average particle diameter ($D_{50}$) of the spherical carbon-based particle is 2 μm to 50 μm.

7. The negative electrode active material of claim 1, wherein the spherical carbon-based particle is included in an amount of 40 wt % to 95 wt % based on a total weight of the negative electrode active material.

8. The negative electrode active material of claim 1, wherein a weight ratio of the spherical carbon-based particle to the nano-particle is 98:2 to 50:50.

9. The negative electrode active material of claim 1, wherein the carbon-based layer is included in an amount of 0.5 wt % to 50 wt % based on a total weight of the negative electrode active material.

10. The negative electrode active material of claim 1, wherein the oxide layer further comprises lithium silicate.

11. The negative electrode active material of claim 10, wherein the lithium silicate comprises at least any one of $Li_2SiO_3$, $Li_4SiO_4$, or $Li_2Si_2O_5$.

12. A negative electrode comprising a negative electrode active material of claim 1.

13. A secondary battery comprising:
    the negative electrode of claim 12;
    a positive electrode;
    a separator interposed between the positive electrode and the negative electrode; and
    an electrolyte.

14. The negative electrode active material of claim 1, wherein sphericity of the spherical carbon-based particle is from 0.6 to 0.9.

15. The negative electrode active material of claim 1, wherein the LiF is included in an amount of 0.2 wt % to 5 wt % based on a total weight of the negative electrode active material.

16. The negative electrode active material of claim 1, wherein the nano-particle is included in an amount of 2 wt % to 40 wt % based on a total weight of the negative electrode active material.

\* \* \* \* \*